(12) United States Patent
Yamaguchi et al.

(10) Patent No.: US 12,025,245 B2
(45) Date of Patent: Jul. 2, 2024

(54) JOINT STRUCTURE

(71) Applicant: IHARA SCIENCE CORPORATION, Tokyo (JP)

(72) Inventors: Osamu Yamaguchi, Tokyo (JP); Yoshitaka Hara, Tokyo (JP)

(73) Assignee: IHARA SCIENCE CORPORATION, Tokyo (JP)

( * ) Notice: Subject to any disclaimer, the term of this patent is extended or adjusted under 35 U.S.C. 154(b) by 281 days.

(21) Appl. No.: 17/433,798

(22) PCT Filed: Feb. 12, 2020

(86) PCT No.: PCT/JP2020/005406
§ 371 (c)(1),
(2) Date: Aug. 25, 2021

(87) PCT Pub. No.: WO2020/175143
PCT Pub. Date: Sep. 3, 2020

(65) Prior Publication Data
US 2022/0136629 A1    May 5, 2022

(30) Foreign Application Priority Data
Feb. 27, 2019   (JP) .................. 2019-034616

(51) Int. Cl.
*F16L 19/065*   (2006.01)
*F16L 19/06*    (2006.01)
(Continued)

(52) U.S. Cl.
CPC ........... *F16L 19/061* (2013.01); *F16L 19/065* (2013.01); *F16L 19/075* (2013.01); *F16L 19/08* (2013.01); *F16L 21/08* (2013.01)

(58) Field of Classification Search
None
See application file for complete search history.

(56) References Cited

U.S. PATENT DOCUMENTS 7,806,443 B1 * 10/2010 Plattner ................ F16L 19/106
285/332.1
2004/0212192 A1  10/2004 Williams
(Continued)

FOREIGN PATENT DOCUMENTS

DE   102012103878   11/2013
JP   2007-502940 A   2/2007
(Continued)

OTHER PUBLICATIONS

International Preliminary Report on Patentbility in PCT/JP2020/005406, dated Feb. 12, 2020.
(Continued)

*Primary Examiner* — Aaron M Dunwoody
(74) *Attorney, Agent, or Firm* — DLA Piper LLP (US)

(57) ABSTRACT

Provided is a joint structure with which a pipe can be disconnected without moving the pipe in a longitudinal direction thereof, even if the pipe is not machined. A first sleeve has an inner cavity into which a pipe is inserted, and one end part of the first sleeve comes into contact with a joint body. A second sleeve has a hole into which the pipe is inserted, and one end part of the second sleeve comes into contact with the other end part of the first sleeve. A nut covers one end part of the joint body, the first sleeve, and the second sleeve, and the nut is threaded onto the joint body in a state of pressing against the surface of the second sleeve on the side opposite from the first sleeve.

5 Claims, 10 Drawing Sheets

(51) Int. Cl.
*F16L 19/075* (2006.01)
*F16L 19/08* (2006.01)
F16L 21/08 (2006.01)

(56) References Cited

U.S. PATENT DOCUMENTS

| | | | |
|---|---|---|---|
| 2008/0007050 A1 | 1/2008 | Williams et al. | |
| 2009/0167015 A1 | 7/2009 | Nakata et al. | |
| 2010/0140932 A1 | 6/2010 | Williams et al. | |
| 2015/0323110 A1* | 11/2015 | Trivett | F16L 19/103 |
| | | | 285/389 |

FOREIGN PATENT DOCUMENTS

| | | |
|---|---|---|
| JP | 2009-522525 A | 6/2009 |
| JP | 2010-534804 | 11/2010 |
| JP | 3195332 U | 1/2015 |
| TW | 1306140 B | 11/1995 |

OTHER PUBLICATIONS

International Search Report in PCT/JP2020/005406, dated Mar. 24, 2020.
Written Opinion in PCT/JP2020/005406, dated Mar. 24, 2020.
International Preliminary Report on Patentbility in PCT/JP2020/005406, dated Sep. 10, 2021.

\* cited by examiner

JOINT STRUCTURE

CROSS REFERENCE TO RELATED APPLICATIONS

This application is a U.S. National Stage Application of International Application No. PCT/JP2020/005406 filed Feb. 12, 2020, which claims priority from Japanese Patent Application No. 2019-034616 filed Feb. 27, 2019. The entirety of all the above-listed applications are incorporated herein by reference.

TECHNICAL FIELD

The present disclosure relates to a joint structure.

BACKGROUND ART

In piping facilities for circulating fluid, a joint structure for connecting a hollow pipe to another member is used (see PTL 1 and PTL 2).

In the piping facilities, it may be necessary to disconnect a pipe, which is connected by the joint structure, in order to repair or replace a part such as the pipe. In order to remove the connected pipe, it is necessary to create a gap between the pipe and another member by moving the pipe in a longitudinal direction thereof. However, in piping facilities in which a plurality of parts such as a pipe are combined, it may be difficult to move the pipe in the longitudinal direction.

On the other hand, PTL 3 discloses a joint structure capable of disconnecting a pipe by sliding the pipe in a direction orthogonal to the longitudinal direction.

CITATION LIST

Patent Literature

[PTL 1]
Japanese Translation of PCT Application No. 2007-502940
[PTL 2]
Japanese Translation of PCT Application No. 2009-522525
[PTL 3]
Japanese Utility Model Registration No. 3195332

SUMMARY OF INVENTION

Technical Problem

However, in the joint structure described in PTL 3, one end of the pipe has to be machined by flaring, which incurs time and effort.

An object of the present disclosure is to provide a joint structure capable of disconnecting a pipe without moving the pipe in the longitudinal direction, even if the pipe is not machined.

Solution to Problem

A joint structure according to one embodiment of the present invention includes: a hollow joint body; a first sleeve that has a cylindrical portion having an inner cavity, into which a pipe is inserted, and a locking portion that protrudes inward in a radial direction thereof from one end part of the cylindrical portion, with the locking portion coming into contact with the joint body; a second sleeve that has a hole, into which the pipe is inserted, and a contact portion that comes into contact with the other end part of the cylindrical portion, with the contact portion rising diagonally from an outer peripheral surface of the pipe in a direction away from the first sleeve; and a nut that covers one end part of the joint body, the first sleeve and the second sleeve and is tightened to the joint body in a state of pressing against a surface of the second sleeve on a side opposite from the first sleeve.

Advantageous Effects of Invention

According to the present invention, it is possible to disconnect a pipe without moving the pipe in the longitudinal direction, even if the pipe is not machined.

DESCRIPTION OF EMBODIMENTS

Hereinafter, embodiments of the present disclosure will be described with reference to the drawings.

Figure 1:
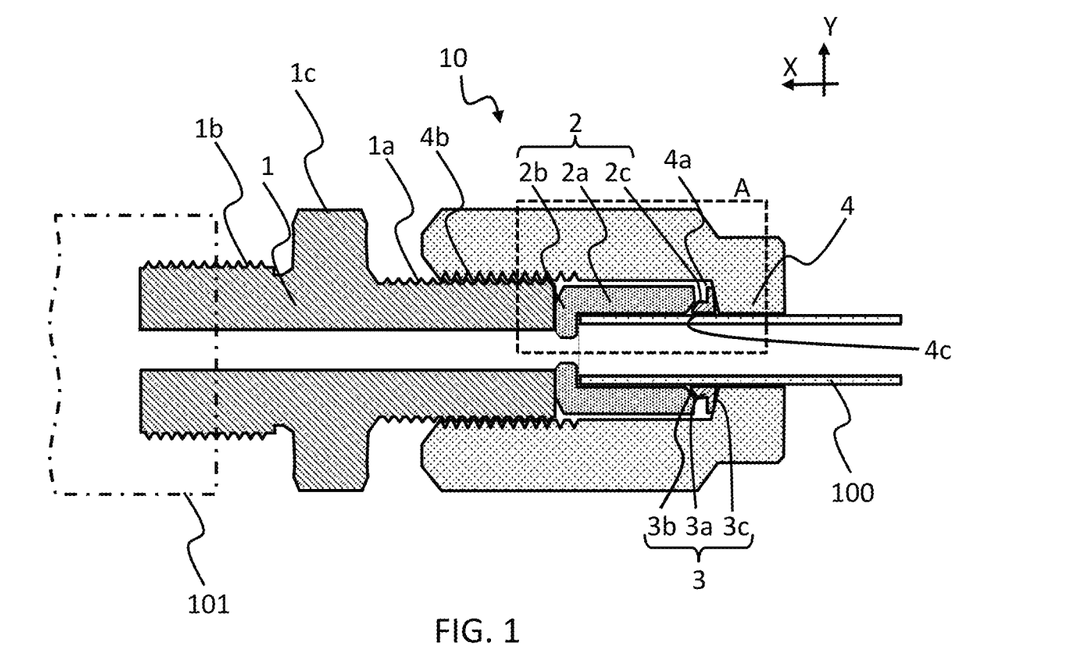
FIG. 1 is an axial longitudinal sectional view illustrating a joint structure in a connected state according to the first embodiment of the present disclosure.
Figure 2:
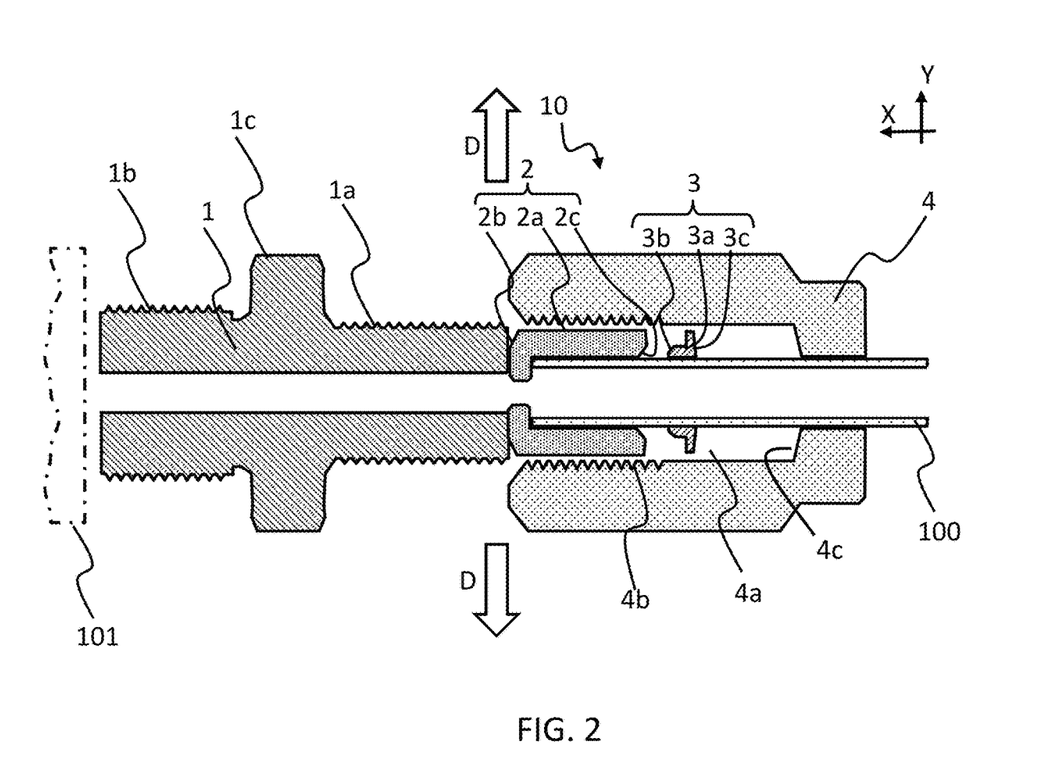
FIG. 2 is an axial longitudinal sectional view illustrating a joint structure in a disconnected state according to the first embodiment of the present disclosure.
Figure 3:
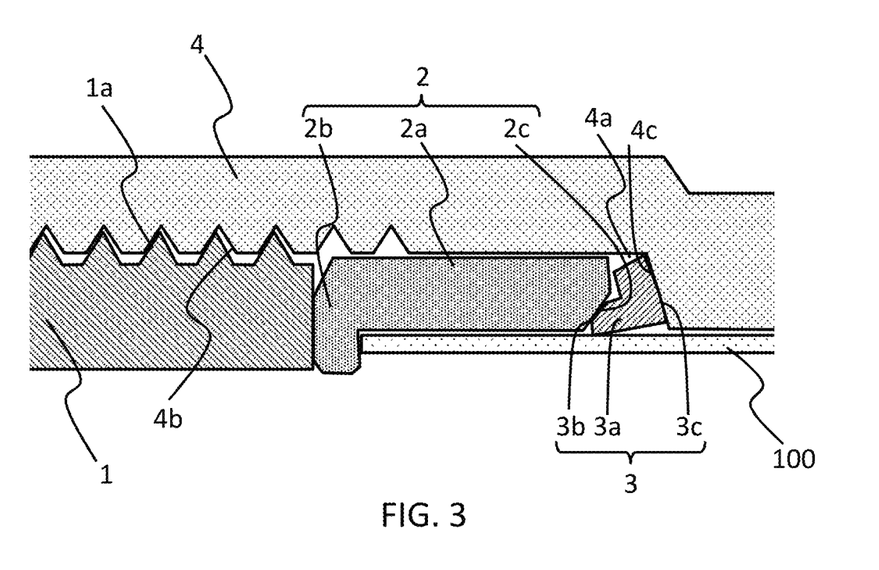
FIG. 3 is an enlarged view of region A in FIG. 1.
Figure 4:
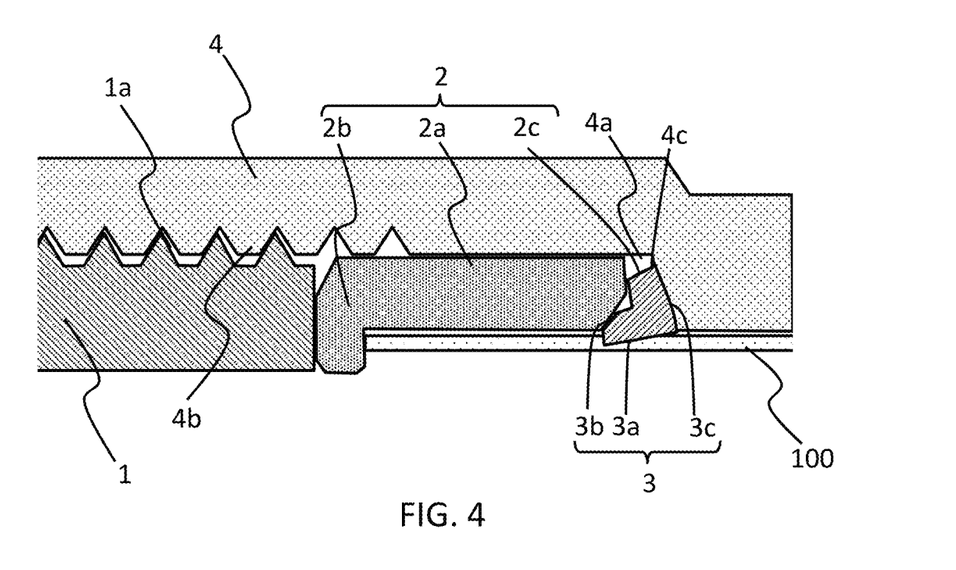
FIG. 4 is an axial longitudinal sectional view illustrating a state in which the tip of a second sleeve is inserted into the outer periphery of a pipe, illustrating the completion of tightening of a nut in the first embodiment of the present disclosure.

FIGS. 1 to 4 are axial longitudinal sectional views illustrating a joint structure according to a first embodiment of the present disclosure. A joint structure 10 illustrated in FIGS. 1 to 3 is a structure that connects a hollow pipe 100 to another member (a manifold 101 in the example of the drawing). FIG. 1 illustrates the joint structure 10 in a connected state in which the pipe 100 and the manifold 101 are connected, and FIG. 2 illustrates the joint structure 10 in a disconnected state in which the connection between the pipe 100 and the manifold 101 is released. FIG. 3 is an enlarged view of region A of FIG. 1. FIG. 4 is a diagram illustrating the completion of tightening of a nut. In the drawings, the axial direction is the X direction, and the radial direction (the direction perpendicular to the axis) is the Y direction.

As illustrated in FIGS. 1 to 4, the joint structure 10 includes a hollow joint body 1, a first sleeve 2 and a second sleeve 3, and a nut 4 arranged across one end part of the joint body 1 and one end part of the pipe 100 in a connected state. In the connected state, the joint body 1, the first sleeve 2, and the second sleeve 3 are arranged side by side in that order. In the following, the joint body 1 side is referred to as the front side, and the second sleeve 3 side is referred to as the rear side.

A male thread portion 1a that is threaded onto the nut 4 is formed on the outer peripheral surface of one end part (the end part on the pipe 100 side) of the joint body 1, and a male thread portion 1b that is threaded onto the manifold 101 is formed on the outer peripheral surface of the other end part (the end part on the manifold 101 side). A gripping portion 1c of which a cross-section along the radial direction Y is substantially polygonal (for example, substantially hexagonal) is formed between the male thread portion 1a and the male thread portion 1b.

The first sleeve 2 is arranged between the joint body 1 and the second sleeve 3. The first sleeve 2 has a cylindrical portion 2a, a locking portion 2b, and an inclined surface 2c.

The cylindrical portion 2a is a portion having an inner cavity into which the pipe 100 is inserted. An inclined surface 2c is formed at the end part of the rear end surface of the cylindrical portion 2a on the pipe 100 side. As a result, an annular gap is formed between the rear end part of the cylindrical portion 2a and the outer peripheral surface of the pipe 100.

The locking portion 2b is formed between the joint body 1 and the cylindrical portion 2a, and comes into contact with one end part of the joint body 1. The locking portion 2b is formed as a protruding portion that protrudes inward in the radial direction Y. As a result, the pipe 100 inserted into the cylindrical portion 2a comes into contact with the locking portion 2b to prevent the same from being inserted into the joint body 1.

The second sleeve 3 is arranged on the rear side of the first sleeve 2. The second sleeve 3 has an annular portion 3a and a contact portion 3b.

The annular portion 3a is a portion having a hole into which the pipe 100 is inserted. As illustrated in FIGS. 3 and 4, a rear end surface 3c of the annular portion 3a is inclined toward the front side (the joint body 1 side) toward the outer side in the radial direction Y.

The contact portion 3b is a wedge-shaped portion formed at the end part on the first sleeve 2 side of the annular portion 3a. The contact portion 3b is inclined so as to face the inclined surface 2c of the first sleeve 2. That is, the contact portion 3b is inclined so as to become thicker toward the rear side. The contact portion 3b enters the inclined surface 2c (more specifically, an annular gap formed by the inclined surface 2c) of the first sleeve 2.

The nut 4 is a hollow member that is tightened onto the joint body 1 in a state where the pipe 100 is inserted. The nut 4 has an accommodating chamber 4a, a female thread portion 4b, and an inner wall surface 4c.

The accommodating chamber 4a is an internal space for accommodating a portion (a rear end part) of the joint body 1, the first sleeve 2, and the second sleeve 3 in the connected state. The inner wall surface 4c at the rear of the accommodating chamber 4a comes into contact with the rear end surface 3c of the second sleeve 3 (specifically, the annular portion 3a). The inner wall surface 4c is inclined toward the front side (the joint body 1 side) toward the outer side in the radial direction Y. The inclination angle (tapering angle) of the inner wall surface 4c and the inclination angle of the rear end surface 3c may be equal to each other or different from each other.

The female thread portion 4b is provided on the inner peripheral surface of the front end part of the accommodating chamber 4a, and is threaded onto the male thread portion 1a of the joint body 1 in the connected state. In the example illustrated in the drawing, the male thread portion 1a is formed on the joint body 1 and the female thread portion 4b is formed on the nut 4. However, there is no limitation to this configuration as long as the joint body 1 and the nut 4 can be threaded together. For example, a female thread portion may be formed on the joint body 1 and a male thread portion may be formed on the nut 4.

When connecting the pipe 100 and the manifold 101 using the joint structure 10 described above, first, the joint body 1 is fitted to the manifold 101, and the nut 4, the second sleeve 3, and the first sleeve 2 are inserted into the pipe 100 in that order. In this state, the joint body 1 and the locking portion 2b of the first sleeve 2 are brought into contact with each other. After that, the nut 4 is tightened to the joint body 1 while threading the male thread portion 1a of the joint body 1 and the female thread portion 4b of the nut 4 together. As a result, the inner wall surface 4c of the accommodating chamber 4a of the nut 4 comes into contact with the rear end surface 3c of the second sleeve 3, the nut 4 presses the second sleeve 3, and the second sleeve 3 presses the first sleeve 2. As a result, the joint body 1 and the locking portion 2b of the first sleeve 2 are brought into contact with each other, and the first sleeve 2 and the second sleeve 3 are sandwiched between the joint body 1 and the nut 4 (this state is usually referred to as finger-tight). When the nut is further tightened from this state, as illustrated in FIG. 4, the contact portion 3b of the second sleeve 3 is guided to the inclined surface 2c of the first sleeve 2 and is inserted into the pipe 100. As a result, the pipe 100 can be prevented from coming out backward due to the pressure of the fluid passing through the pipe 100, and the second sleeve 3 and the first sleeve 2 are brought into close contact with each other, so that a sealing property is improved.

When the connection between the pipe 100 and the manifold 101 is released, tightening of the nut 4 into the joint body 1 is released so that the nut 4 is moved rearward more than the joint body 1 as illustrated in FIG. 2. Then, one or both of the joint body 1 and the first sleeve 2 are slid in the direction of arrow D in FIG. 2, that is, in the radial direction Y. Therefore, it is possible to release the connection between the pipe 100 and the manifold 101 without moving the pipe 100 backward.

OTHER EMBODIMENTS

FIGS. 5 to 10 are axial longitudinal sectional views illustrating a joint structure of another embodiment of the present disclosure. In FIGS. 5 to 10, the portion corresponding to region A in FIG. 1 is illustrated.

Figure 5:
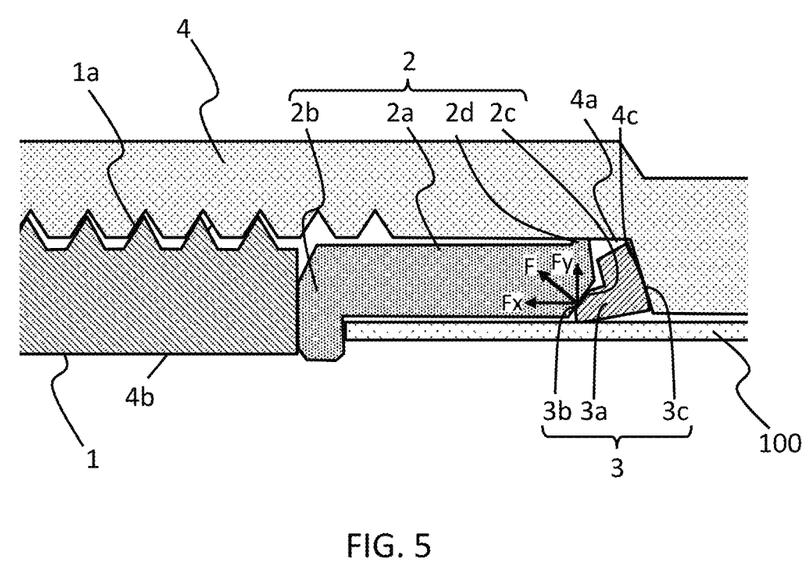
FIG. 5 is an axial longitudinal sectional view illustrating a joint structure in a connected state according to another embodiment of the present disclosure.
Figure 6:
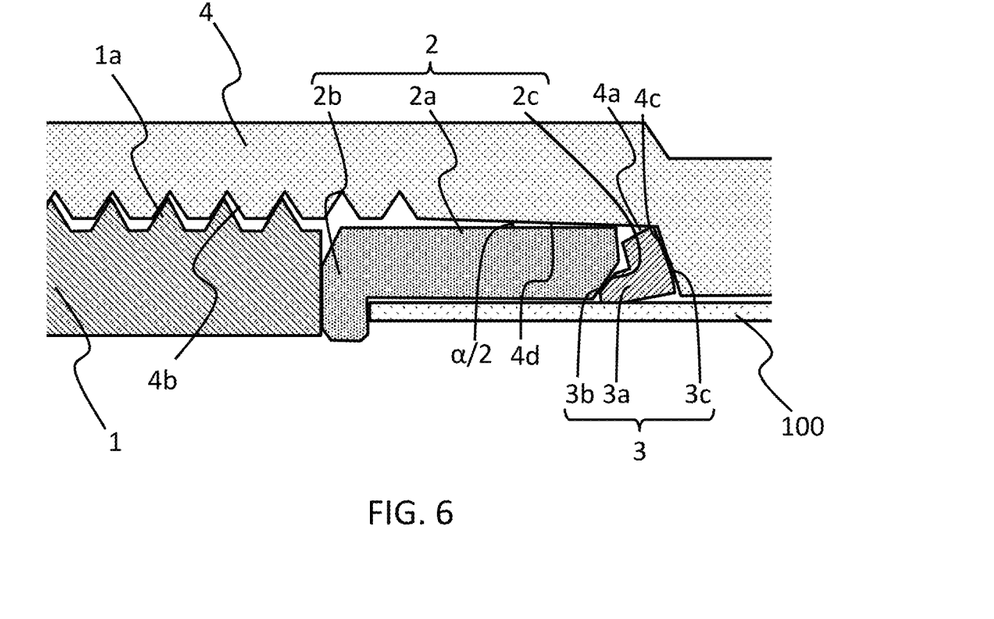
FIG. 6 is an axial longitudinal sectional view illustrating a joint structure in a connected state according to another embodiment of the present disclosure.
Figure 7:
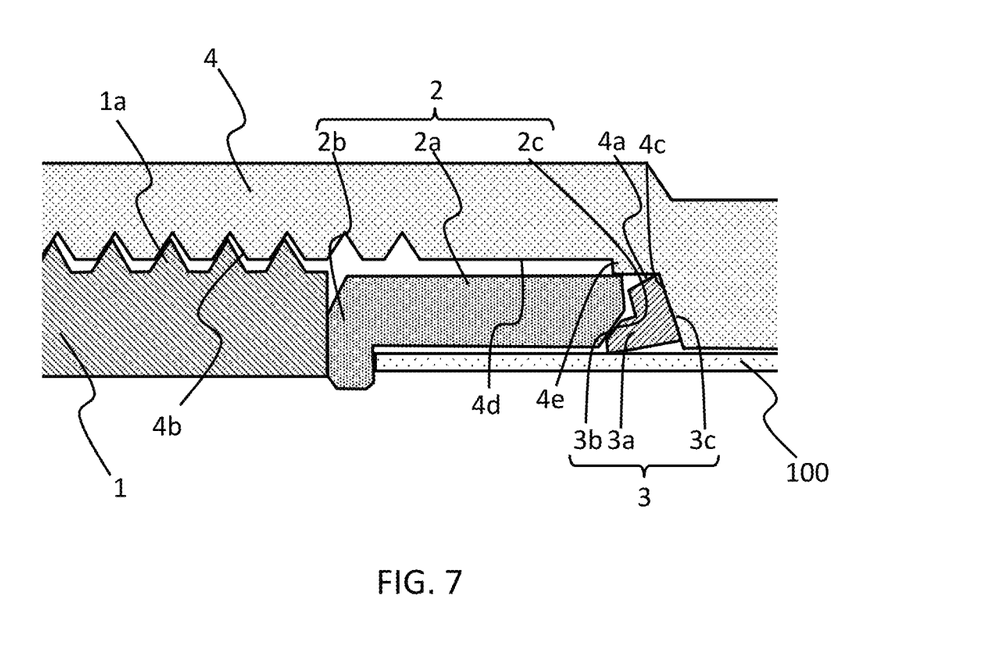
FIG. 7 is an axial longitudinal sectional view illustrating a joint structure in a connected state according to another embodiment of the present disclosure.

FIGS. 5 to 7 are different from the first embodiment in that a limiting portion for limiting the deviation of the first sleeve 2 in the radial direction Y is formed.

For example, the example of FIG. 5 is different from the first embodiment in that a ring-shaped convex portion 2d is formed as a limiting portion on the outer peripheral surface of the first sleeve 2. It is desirable that the convex portion 2d is formed at the rear end part of the cylindrical portion 2a of the first sleeve 2.

As illustrated in FIG. 5, when the nut 4 is tightened to the joint body 1, the second sleeve 3 comes into contact with the first sleeve, and a force F is applied in the direction indicated by an arrow in the drawing from the second sleeve 3 to the first sleeve 2. An axial component Fx of the force F is a force that presses the first sleeve 2 against the joint body 1. On the other hand, a radial component Fy of the force F acts such that the rear end part of the first sleeve 2 is shifted in the radial direction Y (the rear end is deformed (more specifically, widened) in the Y direction). As a result, the front end part of the first sleeve 2 may be tilted, and the joint body 1 and the first sleeve 2 may be displaced from each other. However, in the example of FIG. 5, since the convex portion 2d formed at the rear end part of the first sleeve 2 comes into contact with the nut 4, the rear end part of the first sleeve 2 can be prevented from being displaced in the radial direction Y.

The example of FIG. 6 is different from the first embodiment in that the inner peripheral surface 4d of the nut 4 facing the first sleeve 2 and the second sleeve 3 is formed as an inclined portion provided with a taper (inclination). Specifically, the inclined portion (inner peripheral surface 4d) is inclined so that the inner diameter of the nut 4 becomes wider toward the front. It is desirable that the tapering angle α of the inner peripheral surface 4d is adjusted so that the inner peripheral surface 4d of the nut 4 and the outer peripheral surface of the first sleeve 2 come into contact with each other at the rear portion of the first sleeve 2 in the connected state. Even in this case, as in the example of FIG. 5, it is possible to prevent the rear end part of the first sleeve 2 from being displaced in the radial direction Y.

The example of FIG. 7 is different from the first embodiment in that a step 4e is provided in the inner peripheral surface 4d of the nut 4. The step 4e is formed so that the inner peripheral surface of the front side of the step 4e is farther from the first sleeve 2 than the inner peripheral surface of the rear side of the step 4e. Further, it is desirable that the step 4e is formed so that a portion of the inner peripheral surface 4d of the nut 4 on the rear side of the step 4e comes into contact with the outer peripheral surface of the first sleeve 2 in the connected state. Even in this case, as in the example of FIG. 5, it is possible to prevent the rear end part of the first sleeve 2 from being displaced in the radial direction Y.

The configurations described in FIGS. 5 to 7 may be combined. For example, both the inclined portion and the step 4e may be provided in the inner peripheral surface of the nut 4. Further, both the convex portion 2d of the first sleeve 2 and at least one of the inclined portion and the step 4e on the inner peripheral surface of the nut 4 may be provided.

Figure 8:
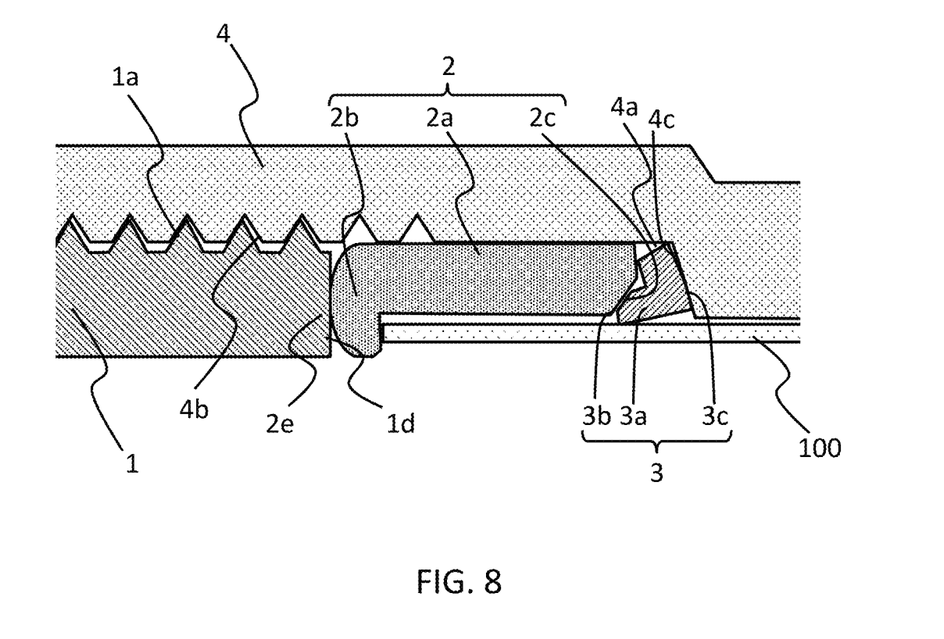
FIG. 8 is an axial longitudinal sectional view illustrating a joint structure in a connected state according to another embodiment of the present disclosure.

Further, in each embodiment, the rear end surface of the joint body 1 and the front end surface of the first sleeve 2 that come into contact with each other are formed as flat surfaces, but the present invention is not limited to this example. For example, at least one of the rear end surface of the joint body 1 and the front end surface of the first sleeve 2 may be formed as a convex curved surface. At this time, the other of the end surface of the joint body 1 and the front end surface of the first sleeve 2 may be formed as a flat surface or a concave curved surface. In the example of FIG. 8, the front end surface 2e of the first sleeve 2 is formed as a convex curved surface with respect to the rear end surface 1d of the joint body 1.

Figure 9:
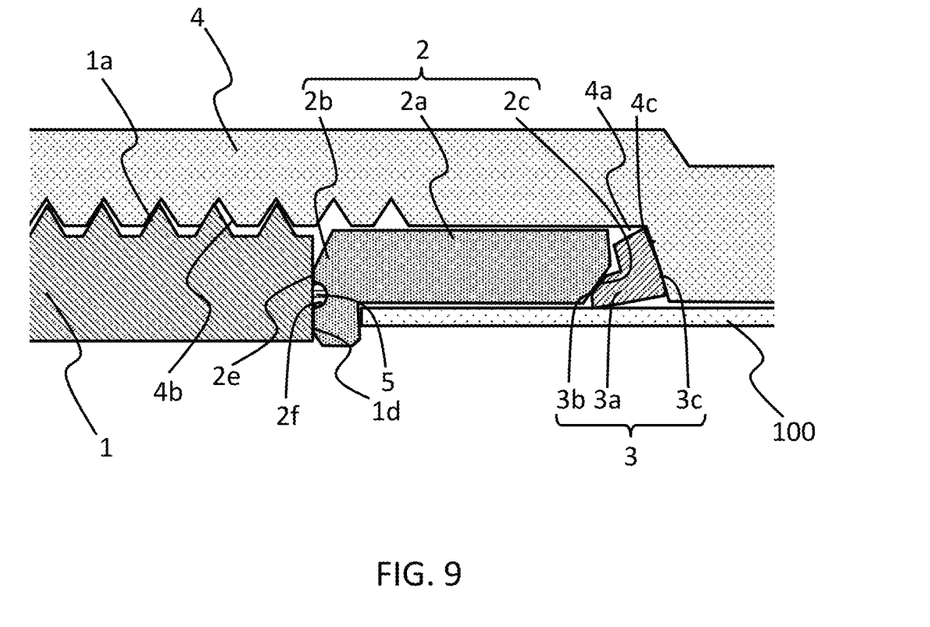
FIG. 9 is an axial longitudinal sectional view illustrating a joint structure in a connected state according to another embodiment of the present disclosure.

Further, an annular concave portion may be provided in at least one of the rear end surface 1d of the joint body 1 and the front end surface 2e of the first sleeve 2, and an O-ring may be mounted in the concave portion. In the example of FIG. 9, a concave portion 2f is formed in the front end surface 2e of the first sleeve 2, and an O-ring 5 is mounted in the concave portion 2f.

Figure 10:
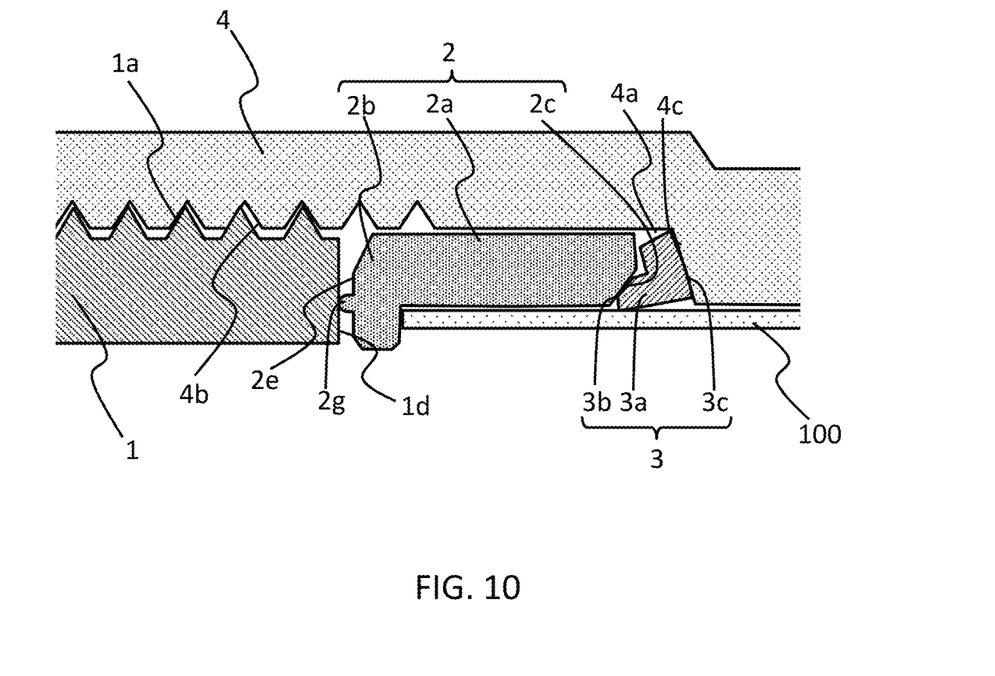
FIG. 10 is an axial longitudinal sectional view illustrating a joint structure in a connected state in another embodiment of the present disclosure.

Further, a convex portion may be provided on at least one of the rear end surface 1d of the joint body 1 and the front end surface 2e of the first sleeve 2. In the example of FIG. 10, a convex portion 2g is formed on the front end surface 2e of the first sleeve 2. The top surface of the convex portion 2g may be flat or may be a convex curved surface.

The configurations illustrated in each of the embodiments described above are merely examples, and there is no limitation to these examples. For example, there may be three or more sleeves. For example, another sleeve may be provided on the front side of the first sleeve, on the rear side of the second sleeve 3, and between the first sleeve 2 and the second sleeve 3.

As described above, the present disclosure includes the following matters.

A joint structure (10) according to one aspect of the present disclosure includes a hollow joint body (1), a first sleeve (2), a second sleeve (3), and a nut (4). The first sleeve has an inner cavity into which a pipe (100) is inserted, and has one end part coming into contact with the joint body. The second sleeve has a hole into which the pipe is inserted, and has one end part coming into contact with the other end part of the first sleeve. The nut covers one end part of the joint body and the first sleeve and the second sleeve, and is threaded onto the joint body in a state of pressing against the surface of the second sleeve on the side opposite from the first sleeve.

According to this configuration, the joint body and one end part of the first sleeve are brought into contact with each other, and the nut covering the one end part of the joint body, the first sleeve and the second sleeve is tightened to the joint body in a state of pressing against the surface of the second sleeve on the side opposite from the first sleeve.

Therefore, due to the pressing of the nut, the first sleeve can be brought into close contact with the joint body via the second sleeve, and the sealing property can be ensured. Therefore, it is possible to secure the sealing property without machining the pipe. In addition, the connection can be released simply by releasing the tightening of the nut and sliding the joint body and the first sleeve in the radial direction. Therefore, the connection can be released without moving the pipe in the longitudinal direction thereof.

Further, the first sleeve has a cylindrical portion (2a) having an inner cavity and a protruding portion (2b) protruding inward in the radial direction from one end part of the cylindrical portion, and the protruding portion comes into contact with the joint body. Therefore, it is possible to prevent the pipe from being inserted into the joint body.

Further, a limiting portion for limiting deformation in an axial direction of the first sleeve is formed on at least one of the surface of the first sleeve facing the nut and the surface of the nut facing the first sleeve and the second sleeve. Therefore, the contact portion of the second sleeve widens the end part of the first sleeve on the second sleeve side in the radial direction, and accordingly, the end part of the first sleeve on the joint body side is tilted. Thus, deterioration of the close contact state between the joint body and the first sleeve can be prevented.

Further, the limiting portion includes a convex portion (2d) formed on a surface of the first sleeve facing the nut. According to this configuration, the convex portion and the inner peripheral surface of the nut can be brought into contact with each other. Therefore, it is possible to prevent the first sleeve from being deformed in the radial direction.

Further, the place where the nut and the first sleeve come into contact when the pipe is connected can be limited to the convex portion. Therefore, the nut can be easily removed when the pipe is disconnected.

Further, the limiting portion includes an inclined portion formed on the surface (4d) of the nut facing the first sleeve and the second sleeve and inclined so that the inner diameter of the nut becomes wider toward the joint body. According to this configuration, since the rear end part of the first sleeve and the inner peripheral surface of the nut can be brought into contact with each other, it is possible to prevent the first sleeve from being deformed in the radial direction. Further, the place where the nut and the first sleeve come into contact when the pipe is connected can be limited to the rear end part of the first sleeve. Therefore, the nut can be easily removed when the pipe is disconnected.

Further, the limiting portion includes a step formed on the surface of the nut facing the first sleeve so that a portion on the joint body side is farther from the first sleeve than a portion on the second sleeve side. According to this configuration, since the rear end part of the first sleeve and the inner peripheral surface of the nut can be brought into contact with each other, it is possible to prevent the first sleeve from being deformed in the radial direction. Further, the place where the nut and the first sleeve come into contact when the pipe is connected can be limited to the rear end part of the first sleeve. Therefore, the nut can be easily removed when the pipe is disconnected.

The embodiments of the present disclosure described above are examples for explaining the present disclosure, and are not intended to limit the scope of the present invention to those embodiments only. Those skilled in the art can implement the present invention in various other aspects without departing from the scope of the present invention.

REFERENCE SIGNS LIST

1: Joint body 1a, 1b: Male thread portion 1c: Gripping portion 1d: Rear end surface 2: First sleeve 2a: Cylindrical portion 2b: Locking portion 2c: Inclined surface 2d: Convex portion 2e: Front end surface 2f: Concave portion 2g: Convex portion 3: Second sleeve 3a: Annular portion 3b: Contact portion 4: Nut 4a: Accommodating chamber 4b: Female thread portion 4c: Inner wall surface 4d: Inner peripheral surface 4e: Step 5: O-ring 10: Joint structure 100: Pipe 101: Manifold

The invention claimed is:

1. A joint structure comprising:
a hollow joint body;
a first sleeve that has an inner cavity formed therein, into which a pipe is inserted in an axial direction, the first sleeve comprising:
   a cylindrical portion defining a first section of the inner cavity configured to accept the pipe,
   a locking portion disposed at a first end of the cylindrical portion, the locking portion defining a second section of the inner cavity narrower than the first section of the inner cavity, the locking portion having an outer end surface configured to abut the joint body in the axial direction and an inner end surface configured to contact the pipe at an inner end of the first section of the inner cavity, and
   an inclined surface disposed at a second end of the cylindrical portion opposite the first end of the cylindrical portion and defining an annular gap;
a second sleeve that has a hole formed therein, into which the pipe is inserted and through which the pipe passes in the axial direction to enter the inner cavity of the first sleeve, and the second sleeve comprising:
   a contact portion disposed at a first end of the second sleeve and configured to contact the inclined surface of the first sleeve, the contact portion having a wedge shape configured to fit within the annular gap defined by the inclined surface of the first sleeve, and
   an annular portion disposed at a second end of the second sleeve opposite the first end of the second sleeve, the annular portion including a rear end surface inclined in the axial direction toward the hollow joint body, and
a nut that covers one end part of the joint body, the first sleeve and the second sleeve, and is threaded onto the joint body in a state of pressing against the rear end surface of the annular portion of the second sleeve, thereby guiding the contact portion of the second sleeve into the annular gap defined by the inclined surface of the first sleeve to press on an outer surface of the pipe.

2. The joint structure according to claim 1, wherein
a limiting portion that limits deformation in a radial direction of the first sleeve is formed on at least one of a surface of the first sleeve that faces the nut and a surface of the nut that faces the first sleeve and the second sleeve.

3. The joint structure according to claim 2, wherein
the limiting portion includes a convex portion formed on the surface of the first sleeve that faces the nut.

4. The joint structure according to claim 2, wherein
the limiting portion includes an inclined portion formed on the surface of the nut that faces the first sleeve and the second sleeve and inclined so that an inner diameter of the nut becomes wider toward the joint body.

5. The joint structure according to claim 2, wherein
the limiting portion includes a step formed on the surface of the nut that faces the first sleeve so that the joint body side thereof is farther away from the first sleeve than the second sleeve side thereof.

* * * * *